May 22, 1923.
E. D. NEFF
1,455,929
SPOTLIGHT PROJECTING DEVICE
Filed July 17, 1920
3 Sheets-Sheet 1
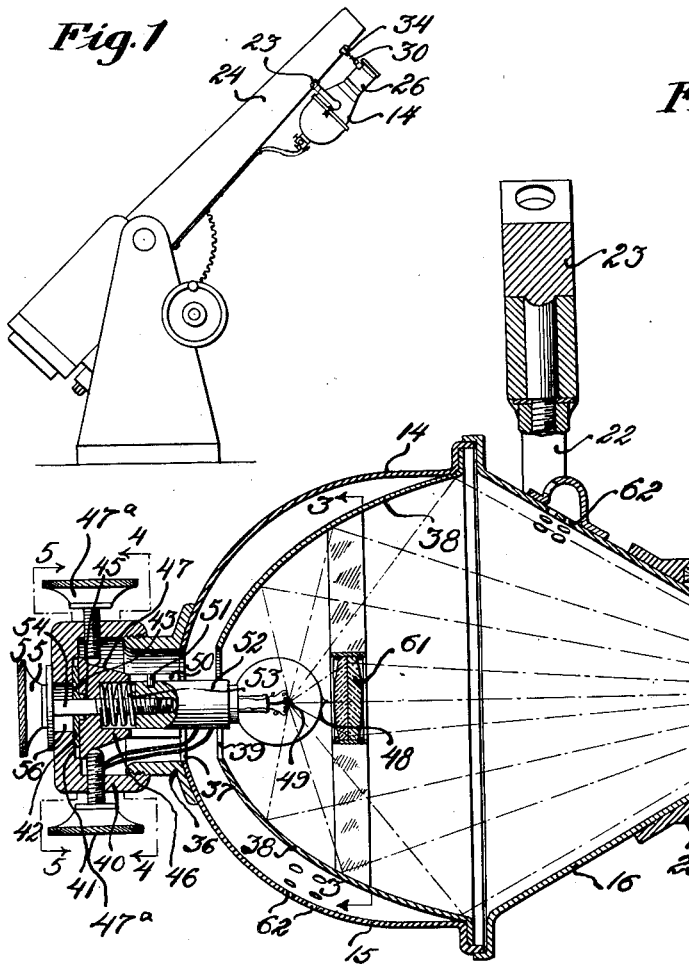
Fig.1
Fig.2
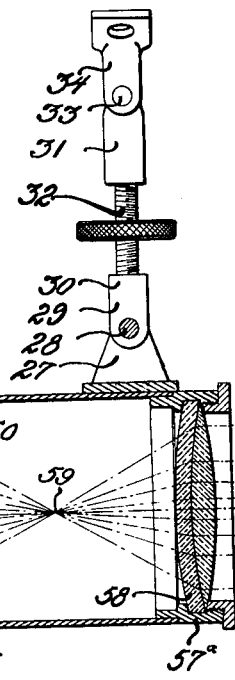
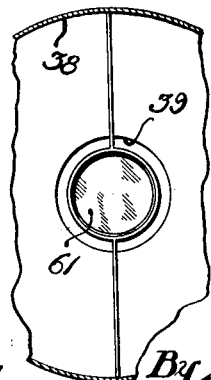
Fig.3
Witnesses
Geo. A. Gruss
Augustus B. Copper
Inventor
Edward D. Neff
By Joshua R. H. Potts
his Attorney

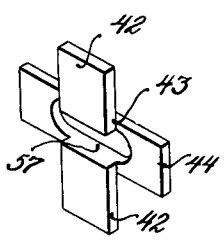
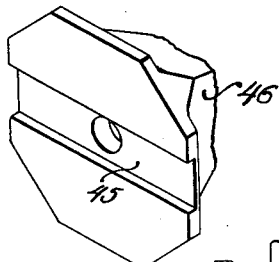
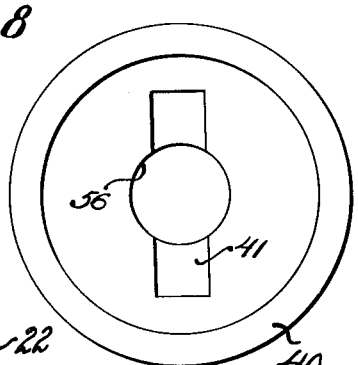
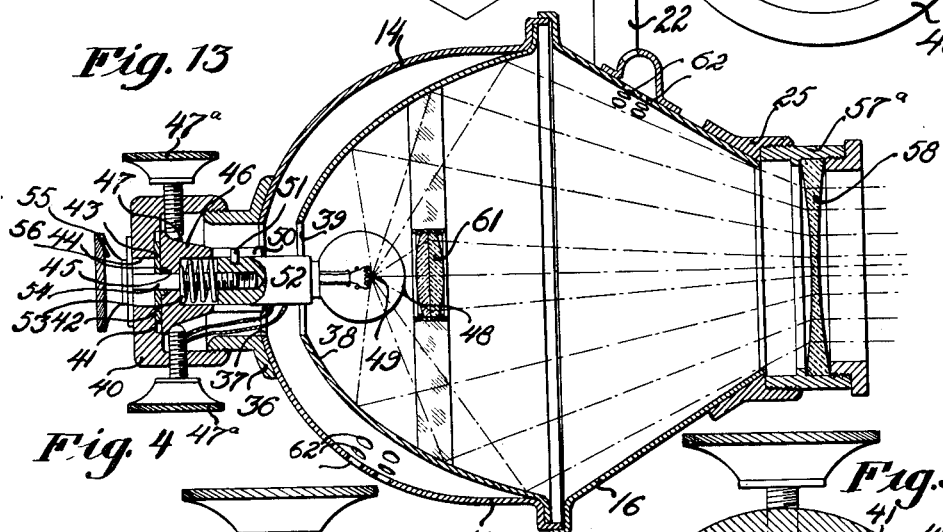
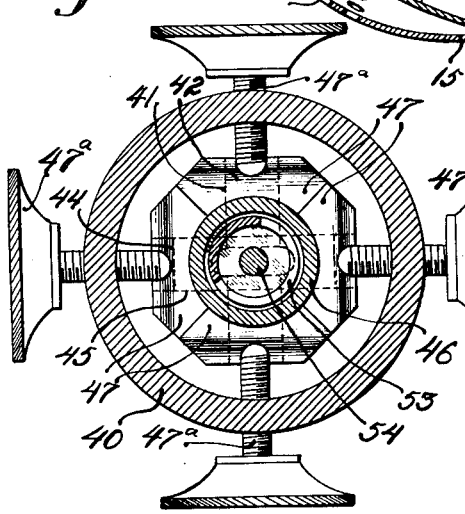
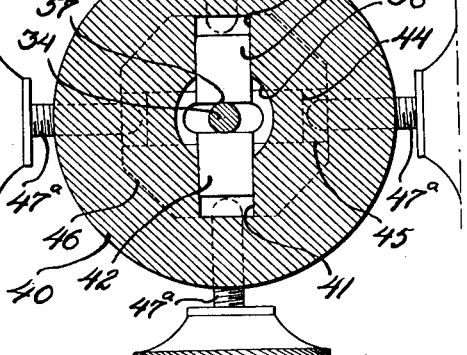

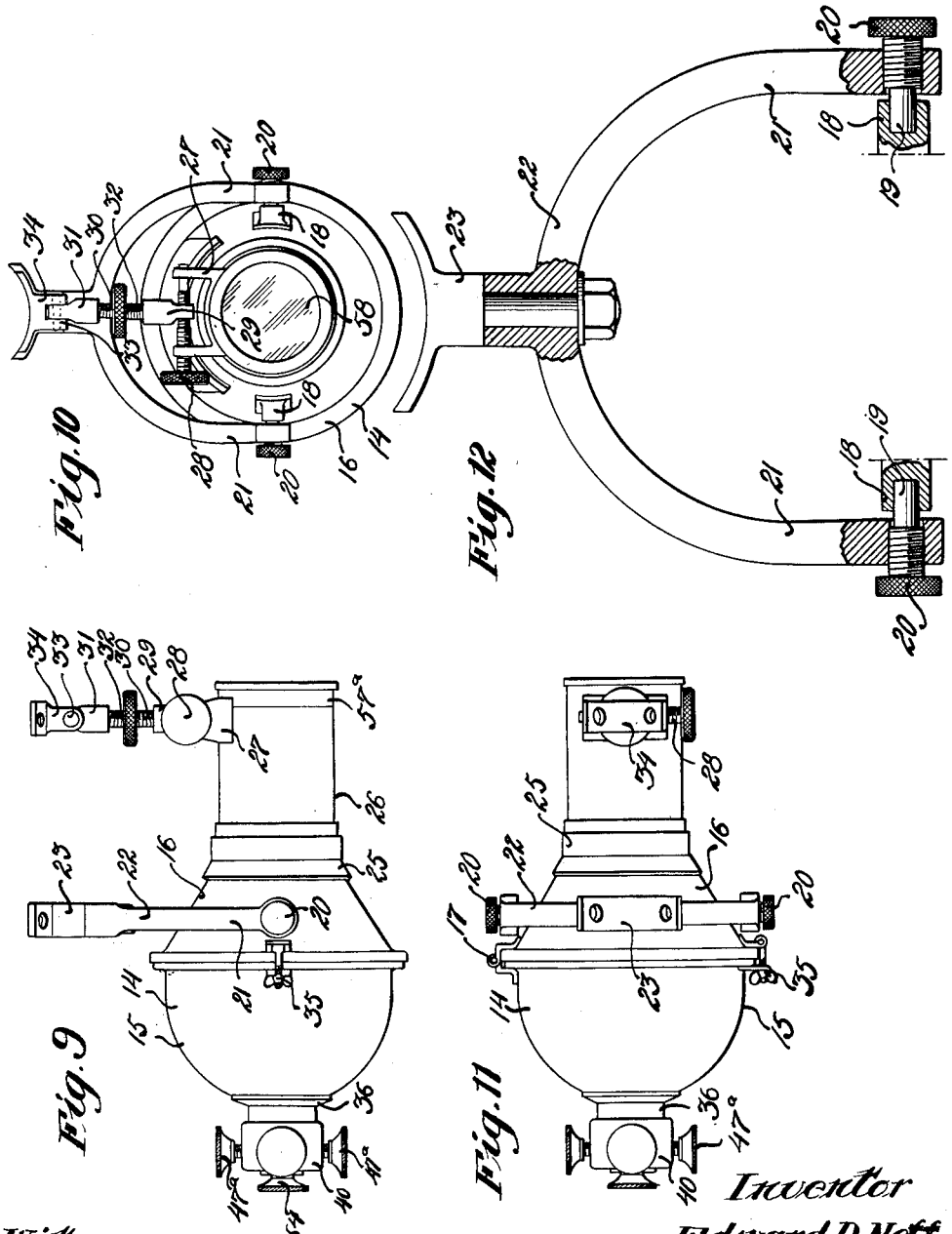

Patented May 22, 1923.

1,455,929

UNITED STATES PATENT OFFICE.

EDWARD DUNBAR NEFF, OF MARYSVILLE, PENNSYLVANIA.

SPOTLIGHT-PROJECTING DEVICE.

Application filed July 17, 1920. Serial No. 397,103.

*To all whom it may concern:*

Be it known that I, EDWARD D. NEFF, a citizen of the United States, residing at Marysville, in the county of Perry and State of Pennsylvania, have invented certain new and useful Improvements in Spotlight-Projecting Devices, of which the following is a specification.

One object of my present invention is to provide an improved device for projecting spot lights and which will be particularly adapted for use in connection with guns for projecting a spot light upon an object which is to be shot at by the gun, such for example as for the purpose of the device forming a part of my United States Patent, No. 1,315,389 of September 9, 1919.

Another object of my present invention is to so construct and arrange the parts thereof that a spot light of great intensity can be projected a comparatively great distance for the purpose above described.

A further object is to so construct the device of my invention that it can be readily adjusted in various directions relatively to the barrel of the gun and may be attached to said barrel.

Another object is to so construct and arrange said parts of my invention that access may be readily had thereto and so that the source of light can be accurately adjusted to produce the best possible results.

In carrying out my invention I preferably employ an ellipsoid reflector in connection with a source of light which can be readily adjusted at one focus point of the ellipsoid reflector so that the rays of light emanating from said source will be projected so as to pass through a lens located at either side of the converging point of the reflected rays so that said lens will cause said rays to be projected from the apparatus in substantially parallel form and in such manner as to cause an extremely intense spot light. In order to treat the light with any degree of perfection the source of light, as far as possible, must either be a point or flat plane surface. By a "point" is meant the nearest practical approach to a point, as for example an electric lamp which has a filament in the form of a closely coiled spiral.

The ellipsoid reflector has the peculiar property that all light striking it, such light source being a "point" located at one focus, is reflected in such lines that the light is gathered to a point; said latter point corresponding to the other focus of the ellipse. The light can then be treated from this point by lenses as though it were the original source of light. By using an ellipsoid reflector as above described in connection with a lens, the reflected light can be concentrated to any desired degree. For example if an eight inch ellipsoid is made to project a beam two inches in diameter, this beam is sixteen times as intense as the beam from an eight inch parabolic reflector for the reason that the intensity is in inverse proportion to the square of the diameter.

If the reflector be made of the form of an ellipsoid as shown in the accompanying drawings having a lamp located at its one focus as near as is practical, the light that strikes the reflector will be concentrated at the other focus of the ellipsoid. If, then, the principal focus of the front lens be located at this point this lens will project the light reaching it from the reflector in a circular beam having its component rays practically parallel. The diameter of the beam will depend on the size of the lens and the relation that the foci of the lens and the reflector bear to each other. By the above arrangement light that strikes the reflector is taken care of, but naturally a great portion of the light goes out in a forward direction uncorrected.

Another object of my invention is to provide an auxiliary lens close to the lamp and so arranged that its conjugate foci are the same points as the foci of the reflector whereby light that strikes the auxiliary lens is concentrated to the same point as that reflected by the reflector.

These objects, and other advantageous ends which will be described hereinafter, I attain in the following manner, reference being had to the accompanying drawings in which Figure 1 is a side elevation of a device constructed in accordance with my invention and attached to the barrel of a gun, such for example as an air-craft gun, Figure 2 is a central longitudinal section view of a device made in accordance with my invention and detached from a gun, Figure 3 is a fragmentary section taken on the line 3—3 of Figure 2, Figure 4 is an enlarged cross section taken on the line 4—4 of Figure 2, Figure 5 is an enlarged cross section taken on the line 5—5 of Figure 2, Figure 6 is a perspective view of a guiding member which I preferably employ as a part of the means for adjusting the lamp, Figure 7 is a fragmentary perspective view of a portion of a lamp socket operative in conjunction with the member shown in Figure 6, Figure 8 is an inside elevation of an adjusting cap which I preferably employ, Figure 9 is an outside elevation of the device shown in Figure 2 and illustrated on a smaller scale, Figure 10 is a front end elevation of Figure 9, Figure 11 is a top plan view of Figure 9, Figure 12 is a view, partly in section, illustrating a yoked suspension bracket for connecting the casing with a device such as a gun barrel, and Figure 13 is a view of the same general character as that shown in Figure 2 with the exception that the device is shortened and includes a minus lens through which the projected rays of light pass prior to crossing at their converging point.

Referring particularly to Figures 1 to 12 inclusive, 14 represents the hollow casing which includes a rear section 15 and a front section 16. These sections are hinged together at one side as shown at 17 in Figure 11; the front section being substantially frusto-conical and at its sides having trunnions 18 in which the cylindrical ends 19 of screw bearings 20 project; said screw bearings extending through tapped holes in the leg portions 21 of a yoked suspension bracket 22. A swivel connection 23 supports the suspension bracket 22 centrally as clearly shown in Figures 1, 9, 11 and 12 and this swivel connection 23 may be attached to the under portion of a gun barrel 24 as shown in Figure 1.

A connecting ring 25 surrounds the forward part of the front section 16 of the casing and provides a screw threaded connection for a projecting tube or sleeve 26. This sleeve has a yoked head 27 thereon provided with a pivot bar 28 in which one end piece 29 of a link 30 is pivotally connected. The link 30 in addition to the end piece 29 includes another end piece 31 and a right and left handed screw 32 for engaging tapped openings respectively in the end pieces 29 and 31 so that by turning the screw 32 the end pieces will be moved toward or from each other. The upper end piece 31 is pivotally connected at 33 to a bifurcated lug 34 which is adapted to be attached to the gun barrel 24 in front of the swivel connection 23 as shown in Figure 1. In this manner the casing is attached to the gun barrel, and the pivot bar 28, as clearly shown in Figure 10, consists of a screw, so that by turning the screw the parts can be laterally adjusted to suit any necessary variation in the alignment and the casing is adapted to swing on the trunnions 18 due to the movement of the adjusting screw 32 in the link 30. A clamping device 35 is positioned directly opposite the hinge 17 so as to hold the front and rear sections together but it is obvious that by releasing the clamping device 35, the rear section 15 can be swung on the hinge 17 into a position to permit access to the interior of the casing.

A rearwardly projecting hollow stem 36 is secured to the back of the rear section 15 in alignment with a hole 37 in said rear section as clearly shown in Figure 2. An ellipsoid reflector 38 is positioned within the rear section 15 and has an opening 39 in alignment with the hole 37 and with the interior of the hollow stem 36. A cap 40 is screwed on the rear of the stem 36 and has a substantially upright channel 41 in which slidably fits extensions 42 on a guiding plate or member 43. The guiding member 43 has a transverse extension 44 arranged in a plane substantially parallel with the plane including the extension 42. This extension 44 is adapted to fit within a transverse channel 45 in the rear of a socket 46; said slot 45 being clearly shown in Figure 7. The socket 46 has beveled surfaces 47 at the top, bottom and both sides as clearly shown in Figures 2 and 4 and these beveled surfaces are abutted by adjusting screws 47ª; said adjusting screws being arranged in sets of two each; one set extending in substantially vertical directions while the other set extends in a substantially horizontal direction or at right angles to the first mentioned set. These adjusting screws fit within tapped holes in the cap 40 and by moving these screws the socket 46 can be adjusted in various positions as will be better understood after reading the following description.

A lamp 48, which may be in the form of an electric incandescent lamp, is arranged with its filament at the focus 49 of the ellipsoid reflector 38. This lamp has a portion slidable within the socket 46; said socket having a slot 50 running in the direction of its length and into which projects a pin 51 on the portion 52 of the lamp 48. A spring 53 is interposed between the rear of the portion 52 of the lamp and the inner end of the socket and tends to move the lamp forwardly. This action however is resisted by the provision of a bolt having a screw threaded stem 54 which fits a tapped hole in the portion 52 of the lamp 48; said stem 54 having a knob 55 which abuts the outer end of the cap 40 and which extends through a hole 56 in said cap. This stem 54 also passes through a slot 57 in the guiding member 43; said channel extending in a transverse direction as clearly shown in Figure 6.

The projecting tube 26 at its forward end includes a lens box 57ª which contains a plus lens 58 arranged in front of the other focus 59 of the ellipsoid reflector 38. In other words, the focus or point 59 represents the converging point of the rays of light which are reflected by the ellipsoid reflector 38 after emanating from the lamp 48 and engaging the inner surface of the reflector. The rays of light after crossing at the focus or point 59 pass through the lens 58 and are projected in substantial parallel formation by said lens 58 as clearly shown in Figure 2. These projected rays will form a spot light of great intensity for reasons above set forth.

The forward end of the front section is preferably flanged inwardly as shown at 60 to provide a stop or diaphragm for the rays of light to pass through in order to secure a sharper definition on the periphery of the beam.

The auxiliary lens above referred to is shown at 61 immediately in front of the lamp 48. This lens 61 concentrates the rays of light passing forwardly from the lamp to the point 59 after which these rays in passing through the lens 58 are corrected and extend parallel with the rays of reflected light above described. The lamp 48 can be moved into practically any position desired by means of the adjusting screws 47ª and the bolt stem 54; it being noted that the spring 53 will automatically move the lamp forwardly when the bolt stem 54 is loosened and the connection of the pin 51 and slot 50 prevents relative rotation between the part 52 of the lamp and the socket 46. The spring 53 also serves as a cushioning means for the lamp upon the recoil of the gun when the latter is shot.

The front and rear sections are preferably provided with perforations as shown at 62 to permit ventilation so as to keep the interior of the casing cool and these perforations are preferably arranged in a manner specified in my above mentioned patent so that while they permit air to circulate through the casing the light will not pass out of the casing through the perforations.

In the above description I have termed the member 38 a lamp and have illustrated the same as an electric incandescent lamp. However, it will be understood that any other form of lamp or source of light may be used instead of the form specifically illustrated and described.

While I have described my invention as taking a particular form, it will be understood that the various parts of my invention may be changed without departing from the spirit thereof, and hence I do not limit myself to the precise construction set forth, but consider that I am at liberty to make such changes and alterations as fairly come within the scope of the appended claims.

Having thus described my invention, what I claim as new and desire to secure by Letters Patent, is:—

1. A device of the character described including a reflector casing having a lamp socket receiving part located adjacent its rear; a lamp socket having opposed beveled surfaces; and adjusting screws fitting tapped holes in said first part and bearing against said opposed surfaces whereby the socket can be moved by loosening on one of said screws and tightening on the other and can be moved longitudinally into clamping engagement with said first part by tightening on both of said screws; substantially as described.

2. A device of the character described including a reflector casing having a lamp socket receiving part located adjacent its rear; a lamp socket having opposed beveled surfaces; adjusting screws fitting tapped holes in said first part and bearing against said opposed surfaces whereby the socket can be moved by loosening on one of said screws and tightening on the other and can be moved longitudinally into clamping engagement with said first part by tightening on both of said screws; and means interposed between said socket and said first part for guiding said socket in a prescribed lateral direction; substantially as described.

3. A device of the character described including a reflector casing having a lamp socket receiving part located adjacent its rear; a lamp socket having pairs of opposed beveled surfaces; two pairs of adjusting screws in said first part and bearing respectively on said surfaces; and means interposed between said socket and said first part operative to guide the socket in predetermined lateral directions to move by adjusting the screws of each pair; substantially as described.

4. A device of the character described including a reflector casing having a hole in its rear and a hollow stem surrounding said hole and projecting rearwardly from the casing; a hollow cap detachably connected to said stem; a lamp socket within said cap; and adjusting screws in said cap adapted to bear on said socket; substantially as described.

5. A device of the character described including a reflector casing having a hole in its rear and a hollow stem surrounding said hole and projecting rearwardly from the casing; a hollow cap detachably connected to said stem; a lamp socket within said cap, said socket having opposed beveled surfaces; and adjusting screws fitting tapped holes in said cap and extending into engagement with the opposed surfaces of said socket whereby the latter can be moved laterally or in the direction of the end of said cap; substantially as described.

6. A device of the character described including a reflector casing; a cap detachably connected to said casing; a lamp socket; adjusting screws in said cap operative to move said socket in various directions and to clamp said socket; a lamp in said socket and having a screw threaded portion; a spring in said socket forming a cushion for said lamp; and a screw extending through said socket and fitting said screw threaded portion of the lamp, said screw having an abutting part in engagement with the outside of said cap; substantially as described.

7. A spot light projecting device including a casing; a reflector within the casing; a cap secured to said casing and having a channel therein; a socket; a lamp positioned to have its rays reflected by said reflector and having a portion within said socket, said socket having a channel therein extending transversely to said first channel; a guiding member having portions slidably fitting within the channels of the socket and cap and having a slot therein; a bolt stem extending through said member and engaging in the portion of said lamp within said socket; and adjusting screws in said cap and adapted to engage and move the socket in transverse directions; substantially as described.

8. A spot light projecting device including a casing; a reflector within the casing; a cap secured to said casing and having a channel therein; a socket; a lamp positioned to have its rays reflected by said reflector and having a portion within said socket, said socket having a channel therein extending transversely to said first channel; a guiding member having portions slidably fitting within the channels of the socket and cap and having a slot therein; a bolt stem extending through said member and engaging in the portion of said lamp within said socket; adjusting screws in said cap and adapted to engage and move the socket in transverse directions; and means for preventing relative rotation between the lamp and the socket; substantially as described.

9. A spot light projecting device including a casing; a reflector within the casing; a cap secured to said casing and having a channel therein; a socket; a lamp positioned to have its rays reflected by said reflector and having a portion within said socket, said socket having a channel therein extending transversely to said first channel; a guiding member having portions slidably fitting within the channels of the socket and cap and having a slot therein; a bolt stem extending through said member and engaging in the portion of said lamp within said socket; adjusting screws in said cap and adapted to engage and move the socket in transverse directions; and a spring interposed between said first socket and lamp; substantially as described.

10. A spot light projecting device including a casing; a reflector within the casing; a cap secured to said casing and having a channel therein; a socket; a lamp positioned to have its rays reflected by said reflector and having a portion within said socket, said socket having a channel therein extending transversely to said first channel; a guiding member having portions slidably fitting within the channels of the socket and cap and having a slot therein; a bolt stem extending through said member and engaging in the portion of said lamp within said socket; and adjusting screws in said cap and adapted to engage and move the socket in transverse directions, said socket having beveled surfaces with which said adjusting screws engage; substantially as described.

11. A spot light projecting device including a casing having a frusto-conical forward portion and a curved rear portion, an ellipsoid reflector within the rear portion of the casing, said reflector and rear portion of the casing having axial openings; a lamp holder over the opening in the rear portion of the casing; a lamp carried by said holder and projecting in the position whereby the rays of light emanating therefrom will be reflected to a point constituting the focus of the ellipsoidal reflector; a projecting tube threadedly mounted on the frusto-conical front portion of the casing spaced from the forward end thereof; a lens located adjacent to said focus and through which the reflected rays pass; and an auxiliary lens interposed between the source of light and the first named lens adapted to converge the rays of light from said source which do not intercept the reflector; substantially as described.

In testimony whereof I have signed my name to this specification in the presence of two subscribing witnesses.

EDWARD DUNBAR NEFF.

Witnesses:
 ELIZABETH GARBE,
 CHAS. E. POTTS.